United States Patent [19]

Deguchi et al.

[11] Patent Number: 4,573,149
[45] Date of Patent: Feb. 25, 1986

[54] MAGNETO-OPTICAL HEAD ASSEMBLY WITH IMPROVED DETECTION MEANS

[75] Inventors: Toshihisa Deguchi, Nara; Kenji Ohta, Yao; Akira Takahashi, Nara; Hideyoshi Yamaoka, Matsubara, all of Japan

[73] Assignee: Sharp Kabushiki Kaisha, Osaka, Japan

[21] Appl. No.: 437,504

[22] Filed: Oct. 28, 1982

[30] Foreign Application Priority Data

| Oct. 29, 1981 | [JP] | Japan | 56-173975 |
| Oct. 29, 1981 | [JP] | Japan | 56-173976 |
| Jan. 18, 1982 | [JP] | Japan | 57-6645 |
| Jan. 22, 1982 | [JP] | Japan | 57-9327 |

[51] Int. Cl.$^4$ .................................. G11B 11/00
[52] U.S. Cl. ........................... 369/13; 360/114; 369/43; 369/46
[58] Field of Search ............ 360/59, 114; 365/122; 369/13, 44, 46, 43, 110

[56] References Cited

U.S. PATENT DOCUMENTS

| 4,065,786 | 12/1977 | Stewart | 369/46 |
| 4,180,775 | 12/1979 | Hsieh | 324/102 |
| 4,381,557 | 4/1983 | Jebens | 369/46 |
| 4,423,496 | 12/1983 | Opheij et al. | 369/46 |
| 4,451,863 | 5/1984 | Yanagida et al. | 369/46 |

Primary Examiner—Robert L. Richardson
Attorney, Agent, or Firm—Birch, Stewart, Kolasch & Birch

[57] ABSTRACT

A magneto-optical head assembly for a reflection type magneto-optical memory apparatus uses a laser beam for recording, retrieving, and erasing data on a recording medium comprised of a vertical, magnetic, and anisotropic thin film. The light beam emitted from the head assembly is guided to a fixed position on said recording medium. Included are a light detection apparatus for receiving a control signal, and a separate light detection apparatus for receiving a data signal. A beam splitter, to which has been applied a multicoated thin film dielectric body capable of increasing the Kerr rotation angle of the laser beam reflected from the recording medium, is positioned in the optical system through which the laser beam passes.

5 Claims, 10 Drawing Figures

MAGNETO-OPTICAL HEAD ASSEMBLY WITH IMPROVED DETECTION MEANS

BACKGROUND OF THE INVENTION

The present invention relates to an optical head for an optical-magnetic memory apparatus which uses a light beam for recording, retrieving, and erasing data. In recent years active research and development activities have been directed to an apparatus using a vertical magnetized film as a memory medium, and to He-Ne lasers, Argon lasers, semiconductor lasers, and other similar types of lasers for optically recording, retrieving and erasing. When this system is combined with magnetic disks, drums, tapes, and similar apparatus, it offers the major advantage of eliminating worry about the head becoming soiled from dust or other foreign objects, or about crushing of the head, as compared with conventional magnetic heads which record, retrieve, and erase by means of a magnetic head whose tip can be positioned about 1 mm from the memory medium.

In the usual optical memory apparatus where high density storage is possible, the dimensions of the record bit are about 1 μm, and for this reason the optical beam must be squeezed into a minute spot. At the same time the size of the light spot must be kept uniform, making a servo-system necessary so that the abovementioned light spot may accurately be traced above the data bit. FIG. 1 shows an example of the basic configuration of the optical head section in a conventional apparatus using the diffraction effect of an optical beam to retrieve data from a data bit in a special retrival optical type video disk. In this system there is a laser apparatus 1, a polarized light beam splitter 2, a ¼ wave length plate 3, an object lens 4, a memory disk 5, a spot lens 6, and an light detection apparatus 7. The said light detection apparatus 7, in order to receive a signal to control the position of the light spot takes various elemental forms. In addition, the said light detection apparatus 7, as well as receiving the abovementioned control signal, also receives data signals.

It is possible for the abovementioned type of conventional optical head used for an optical type video disk to be used in practice as an optical head on an optical magnetic memory apparatus. An example of this is given in FIG. 2. The optical elements which are equivalents to those shown in FIG. 1 carry the same number in FIG. 2 as in FIG. 1. The elements in FIG. 2 which are different than those for video disk usage because of the principles of data retrieval, are the providing of an analyzer 8 between the spot lens 6 and the light detection apparatus 7, the substitution of a polarizer 9 for the ¼ wave length plate 3, and the substitution of a beam splitter with a half mirror function in place of the polarized light beam splitter 2. However, the problem with this configuration is that in optical magnetic retrieving a minute angle of rotation of the polarized light of the reflected data beam must be obtained. In short, when obtaining a data signal, because the transmission axis of the analyzer 8 must be set close to right angles to the direction of the polarized light from the reflected data beam, the quantity of light reaching the light detection apparatus 7, compared to the abovementioned optical type video disk, becomes much smaller. Then, because of this, it becomes extremely difficult to receive a sufficiently accurate control signal from the light detection apparatus 7 (focus error signal, tracking error signal).

OBJECT AND SUMMARY OF THE INVENTION

An object of the present invention is to overcome the problem areas discussed for the abovementioned magneto-optical head, and also to provide a head which is capable of receiving an accurate light spot control signal and which will not lose magneto-optical data.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
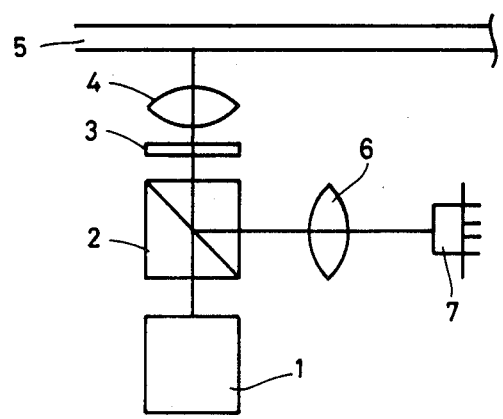
FIG. 1 is a configuration drawing of an optical head for use with a conventional optical type video disk.
Figure 2:
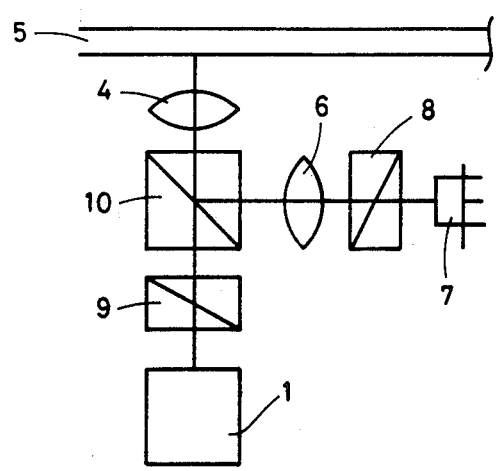
FIG. 2 is a configuration drawing for a conventional magneto-optical head.
Figure 3:
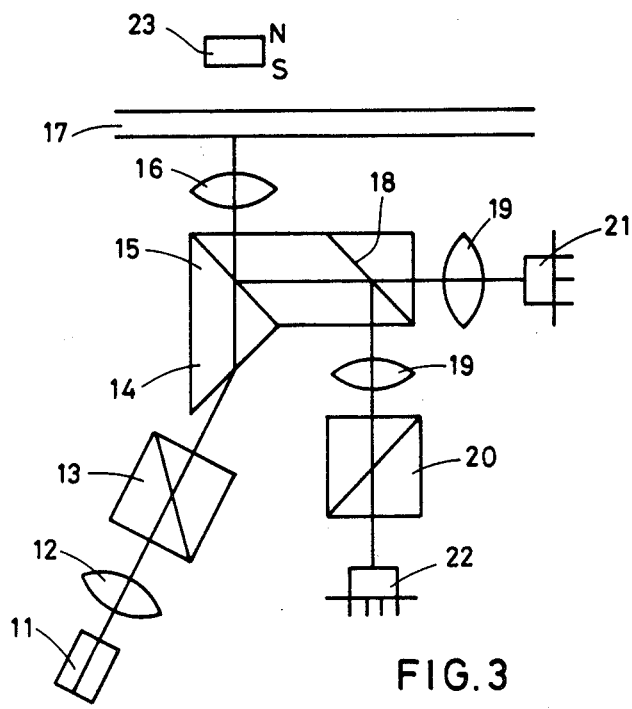
FIG. 3 is a configuration drawing of a magneto-optical head according to the present invention.

FIG. 3 is a configuration drawing showing one embodiment of a magneto-optical head according to the present invention. A semiconductor laser 11 capable of strong modulation is emitted at time of recording, retrieval, and erasing. The system additionally comprises a condensing lens 12, a polarizer 13, a formed prism 14 which converts an oval laser beam to a circle, a beam splitter 15, an object lens 16, an optical magnetic disk 17, a beam splitter 18 which enlarges the magneto-optical angle of rotation and controls the reflected data beam and divided data, a spot lens 19 for condensing the light beams reflected onto each light detection apparatus 21 and 22, an analyzer 20, a light detection apparatus 21 for the control signal, and a light detection apparatus 22 for the data signal. In addition, a permanent magnet 23 impresses a fixed magnetic field on the laser beam irradiation area when recording or erasing is undertaken. The magnetic field can be reversed by a drive mechanism, which is not shown on the drawing, of the said permanent magnet 23. The above-mentioned object lens 16 is driven and controlled in the focus and tracking directions by means of a mechanism not shown on the drawings, and a control signal received from the abovementioned control signal light detection apparatus 21, and it also fixes the light spot in a set position.

Figure 4:
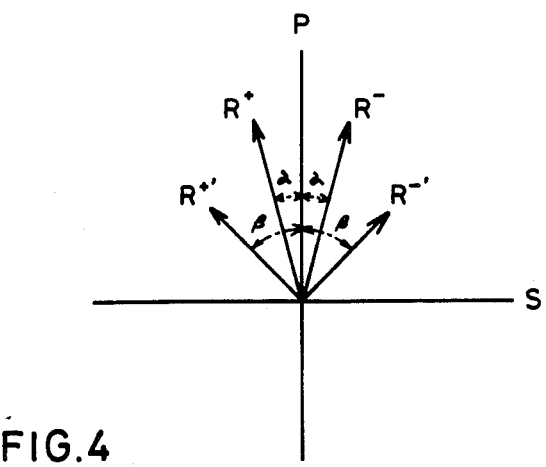
FIG. 4 is a data beam vector drawing.

The optical action of the head mechanism of FIG. 3 will be explained with reference to FIG. 4. FIG. 4 is a vector diagram of the data beam deflection conditions. The beam emitted from the semiconductor laser 11 shines upon the optical magnetic disk 17 under the polarized light conditions shown by P. Then the beam is reflected from the said optical magnetic disk 17 according to the minute magnetized conditions on the optical magnetic disk 17, and as a result of receiving a magneto-optical effect the Kerr angle of rotation of the magnetic medium is rotated $+/31$ (alpha) to become $R^+$ or $R^-$, and both become polarized. If the polarized characteristics of the beam splitter 18 are considered to be $R_s > R_p$ (where $R_s$: S polarization energy irradiation ratio; and $R_p$: P polarization energy irradiation ratio), then the magneto-optical rotation angle for the polarized light radiating on the light detection apparatus 22 for data signals, increases to beta, and this clearly becomes $R^{+\prime}$ and $R^{-\prime}$. At the same time, the quantity of light transmitted to the control signal light detection apparatus 21 becomes almost double the $T_p$ of the amount of light reaching the beam splitter 18 (where $T_p$: P polarized energy transmission ratio).

As an example, if the polarized light characteristics of the beam splitter 18 are $R_p = 0.4$, $R_s = 0.997$, $T_p = 0.6$, $T_s = 0.03$, the magneto-optical angle of rotation increases by a multiple of about 1.5, and again the control signal is able to use about 60% of the amount of light reflected on the detection system. In addition to improving the quality of the resulting data signal, a high quality control signal is received to provide sufficient light to the control signal light detection apparatus 21. In addition, the effectiveness of the present invention is emphasized even more by the use of an Avalanche Photo Diode (APD), for detection of faint light sources, in the data signal light detection apparatus 22.

Using a magneto-optical head having the abovementioned basic characteristics is preferable to miniaturization of the apparatus so that the unit can easily achieve data recording and retrieval from commonly known techniques, and it is preferable that for the laser light source 1, a small output laser apparatus such as the semiconductor laser be used. Therefore, for the memory medium 5, rather than using crystalline magnetic materials with low recording sensitivity, such as MnBi, MnBiAl, and MnbiCu, rare earth metals with high recording sensitivity, such as Dd, Tb, Dy, Sm, etc. and transition metals such as Fe, Co, Ni, etc. are combined and non-crystalline magnetic materials such as TbDyFe, GdTbFe, GdDyFe, TbFe, etc. created and used. Nevertheless, in the abovementioned non-crystalline magnetic materials, the magneto-optical effect is weak as compared to the previously mentioned crystalline magnetic materials, and the so-called Kerr angle of rotation only reaches 0.1 deg, to 0.2 deg, and the S/N ratio of the retrieval signal is low.

Figure 7:
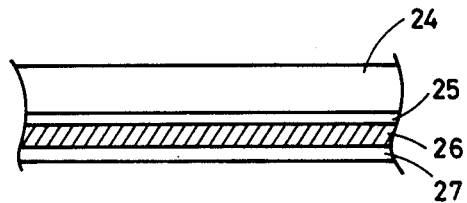
FIG. 7 is a side elevation showing the configuration of a memory element.

Furthermore, the declination of the abovementioned analyzer 20 is difficult to set. For this reason, by improving the memory element construction, as shown in FIG. 7, using a method of increasing the Kerr angle of rotation of the optically reflected light, effort is being made to design an increase in the Kerr angle of rotation. In FIG. 7, a substrate 24 is made from glass or acrylic resin, and a reflection film 25 is formed from a thin film of metal, such as Al, Au, or Cu. The medium further includes a previously mentioned non-crystalline magnetic material 26, and a thin membrane of a transparent dielectric of $SiO_2$, SiO, all of these laminated (in layer 27) by the evaporation method or sputtering method. The thickness of the respective membranes determines their suitability in increasing the Kerr angle of rotation through the interference effectiveness of the thin films.

The beam splitter, which is indispensable for the reflection type magneto-optical head, receives special polarization characteristics, and the magneto-optical effect is emphasized even more, and in addition to the increasing the S/N ratio of the retrieval signal, the azimuth of the detection analyzer is easily established, and the thin-film dielectric body which increases the Kerr angle of rotation of the reflected laser beam from the medium to the beam splitter, is applied in a multi-layer coating. In particular, on the inclined surface of the prism of the beam splitter 18, the energy transmission factor of the P polarization, $T_p$ is $1 > T_p > 0.5$, and the energy reflection factor $R_s$ of the S polarization is $1 > R_s > 0.5$, and this type of optical characteristic resulting from the multiple coatings of the thin film dielectric body is very desirable.

This medium is especially effective in the case of the retrieval operation, and the retrieval method is explained as follows.

Figure 9:
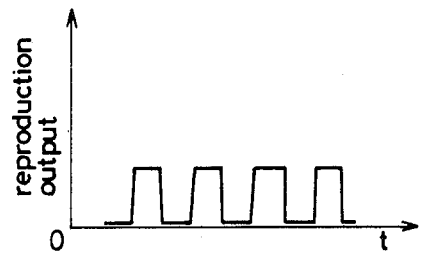
FIG. 9 and FIG. 10 are wave form drawings showing one example of a data retrieval signal from the magneto-optical effect.
Figure 8:
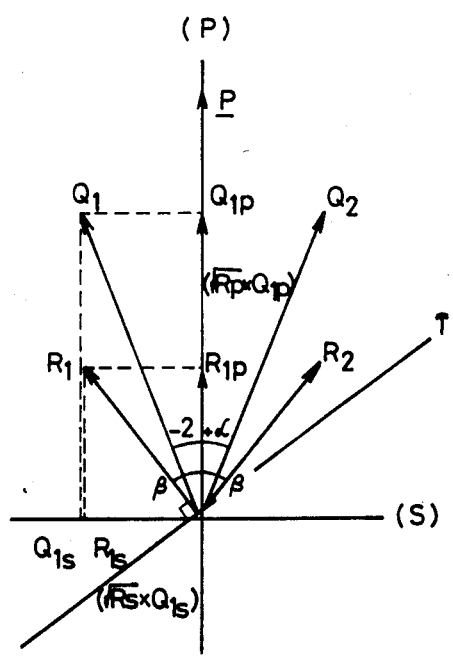
FIG. 8 is an explanatory drawing showing the retrieval principle of a magneto-optical head confirming to the present invention .
Figure 10:
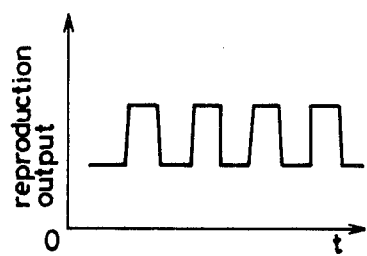

Still referring to FIG. 3, the laser beam emitted from the semiconductor laser 11 is collimated by the condensing lens 12, passes through the polarizer 13 which has a fixed azimuth, then, as is shown by the arrows in the drawing of FIG. 4, in the direction of the arrows on the surface of the paper, becomes an oscillating, straight line polarized light beam (P wave). The said straight line polarized light beam passes through the beam splitter 18, which is coated with the multilayered thin film electric body, to the inclined surface of the prism which has polarized characteristis such that $R_s > R_p$ (where $R_s$: S wave energy reflection factor $R_p$: P wave energy reflection factor), As previously stated, because the incident polarized light is the P wave, the polarized conditions are maintained, and the transmission energy becomes double $T_p$ (where $T_p$: the P wave energy transmission factor of the beam splitter 18). Next, the polarized laser beam, by means of a throttling lens, shines a spot on the memory medium 17, which is already functioning as a magnetic memory. Then, the polarized light laser beam striking the abovementioned spotlighted point, according to the magnetic condition of the illuminated point from the so-called Kerr effect, receives a known magneto-optical effect, and the Kerr angle of rotation, alpha, becomes a rotated polarized laser beam, which is reflected. In other words, as indicated in FIG. 8, as opposed to the incident polarized light P, the region in which the magnetic reflection is received and recorded becomes $+$alpha, the unchanged initial magnetic region outside of that becomes $-$alpha, and the reflected laser beams $Q_1$ and $Q_2$ have their plane of polarization rotated. The reflected laser beam next enters the beam splitter 18, and, from the effect of the previously stated polarized light characteristics, the laser beam reflected on the light detecting apparatus side becomes $R_1$ and $R_2$, and the rotation angle beta of the plane of polarization becomes larger than alpha. Therefore, the transmission axis, as shown in FIG. 8, becomes equivalent to T, and from the setting of the analyzer 20 in the case of the said magneto-optical head scanning the section of the previously mentioned recorded region arranged in pulse condition, as is shown in FIG. 9, a pulsed data signal is received in the direction apparatus 22. However, in actual practice, as a result of the opto-magnetic characteristics of the recording medium 17, the reflected laser beams $Q_1$ and $Q_2$ cancel out the polarized light. At the same time, in the beam splitter 18, between the reflected S waves and P waves, the polarized light reaching the analyzer 20, which is usually used to produce a phase difference, takes on a slight oval shape, and, because of this, the signal output becomes as illustrated in FIG. 10.

The effect of the present invention is not limited to the embodiment shown in FIG. 3. It is possible to omit the analyzer 13 and the formed prism 14, whereby the main component of the polarized light entering the opto-magnetic disk takes the form of an S wave, depending on the characteristics of the laser apparatus used. In this case, if the light detection apparatus 22 for detecting the data signal is positioned on the transmission side of the beam splitter 18, and the light detection apparatus 21 for detecting the control signal is positioned in the reflected side, then the effect obtained by use of the present invention is exactly the same as outlined above.

Figure 5:
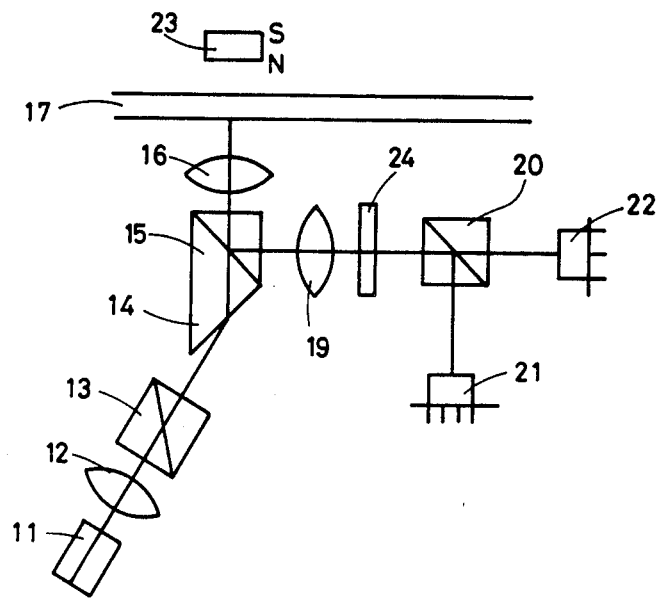
FIG. 5 is a configuration drawing of an additional embodiment of a magneto-optic head according to the present invention.

FIG. 5 is a configuration drawing of another embodiment according to the present invention. Throughout the drawing, components which are the same as in FIG. 3 are numbered in the same way. From this configuration, it is possible to use the reflected light of an surplus analyzer as the control signal in conventional magneto-optical retrieval, and along with obtaining a reduction in parts used in the construction, the light intensity of the control signal beam becomes stronger, and a high quality control signal is obtained. A half-wave-length plate 24, when a data beam is detected, causes the analyzer 20 to rotate, and when this happens the arrangement is such that it makes it unnecessary for the light detection apparatus 21 (for detecting the control signal) to rotate in the same way, and the polarized light entering the light detection apparatus 21 can be set at will. In this configuration, it is acceptable to position the data signal light detection apparatus 22 on the light reflection side of the analyzer 20, and the control signal light detection apparatus 21 on the transmission side.

Figure 6:
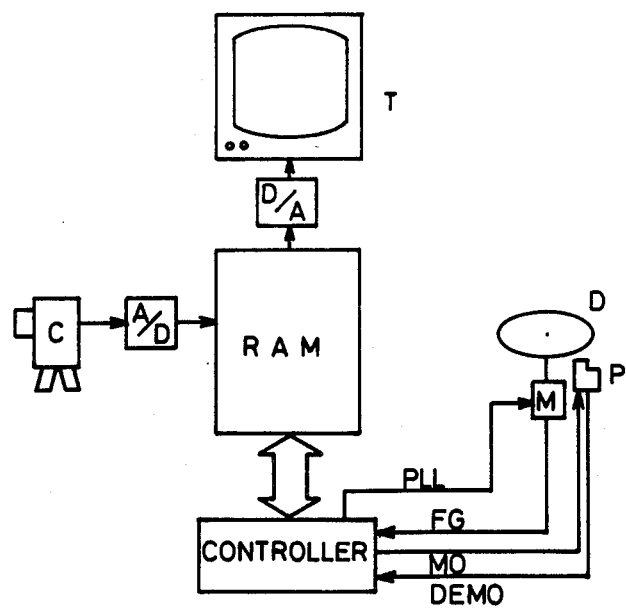
FIG. 6 is a configuration drawing of an image data record retrieval system used with an optical magnetic disk.

Next, we will explain a recording and retrieval system for image data, using a magnetic disk and the magneto-optical head according to the present invention. FIG. 6 illustrates the configuration of this system. A black and white television camera C is used to enter black and white data in image form. The field signal of camera C is converted one frame at a time in the A/D convertor and is stored in a frame memory RAM. The resolution is 512 pixels per line (Sanbring wavelength about 10 MHz), 480 lines per frame, and the gradation is 8 bits per pixel as input to the frame memory RAM. The data stored in this frame memory RAM is modulated by the MFM method, with a quartz radiator clock synchronous in the x-direction of the television screen, and using a clock from a frequency generator FG which is directly connected to a disk drive motor M, synchronous in the y-direction. From this signal, the semiconductor laser of the optical head P is modulated directly and records data on the opto-magnetic head P depend on a track servo based on a focus servo and convex/concave guide track.

At the same time, the signal retrieved with the optical head P is demodulated by MFM, and the demodulated signal is stored in the frame memory RAM. The data stored in this frame memory RAM is continuously and repeatedly read out, converted from digital to analogue on the D/A convertor, and displayed on the television monitor. Retrieval of image data is carried out using the above method.

The storing and retrieval of image data by the system so described, carried out positively through the frame memory RAM, is not accomplished at high speed with the opto-magnetic disk, so it is used as a frequency convertor.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A magneto-optical head assembly for a reflection-type magneto-optical memory apparatus comprising means for generating a laser beam for recording, retrieving, and erasing data on a recording medium comprised of a vertical, magnetic, and anisotropic thin film, means for guiding said laser beam emitted from said head assembly to a fixed position on said recording medium, a first light detection apparatus for receiving a control signal, and a second separate light detection apparatus for receiving a data signal, wherein the laser beam is reflected from the recording medium, said assembly comprising a beam splitter having means for increasing the magneto-optical rotation angle positioned in the light path of said reflected beam for dividing the reflected beam into a beam for control use and a beam for data use.

2. A magneto-optical head assembly for a reflection-type magneto-optical memory apparatus comprising means for generating a laser beam for recording, retrieving, and erasing data on a recording medium comprised of a vertical magnetic, and anisotropic thin film, means for guiding said laser beam emitted from said head assembly to a fixed position on said recording medium, a first light detection apparatus for receiving a control signal, and a second separate light detection apparatus for receiving a data signal, wherein said beam is reflected from said recording medium, said assembly further comprising a beam splitter comprising a multicoated thin film dielectric body for increasing the Kerr rotation angle of the laser beam reflected from the recording medium through which the laser beam passes.

3. A magneto-optical head assembly according to claim 2 wherein said beam splitter includes a prism having an inclined surface, wherein said multicoated thin film dielectric body is applied to said inclined surface of the prism of the said beam splitter for providing said surface with optical characteristics including an energy transmission factor T(sub)p for polarized light having a value such that $1 > T(sub)p > 0.5$, and an energy reflection factor R(sub)s for polarized light having a value such that $1 > R(sub)s > 0.5$.

4. A magneto-optical head assembly for a reflection type magneto-optical memory apparatus for recording, retrieving and erasing data on a recording medium, comprising:

a sole source for generating a laser beam;

means for guiding said beam to the recording medium whereat said beam is reflected from the medium;
beam splitting means in the path of the reflected beam for splitting the reflected beam into a first reflected beam portion and a second reflected beam portion;
a first detection means for generating a data signal, and a second detection means for generating a control signal; and
means for direction said first reflected beam portion to said first detection means and means for directing said second reflected beam portion to said second detection means.

5. An assembly as in claim 4, wherein the recording medium is a vertical, magnetic, anisotropic thin film medium.